United States Patent
Kallenbach et al.

(10) Patent No.: US 12,083,619 B2
(45) Date of Patent: Sep. 10, 2024

(54) METHOD FOR SELECTION OF CAMERA IMAGE SECTIONS

(71) Applicant: II-VI Delaware, Inc., Wilmington, DE (US)

(72) Inventors: Eric Kallenbach, Kleinmachnow (DE); Sven Füßler, Kleinmachnow (DE); Sergej Scharich, Kleinmachnow (DE); Jeroen Jonkers, Kleinmachnow (DE)

(73) Assignee: II-VI DELAWARE, INC., Wilmington, DE (US)

( * ) Notice: Subject to any disclaimer, the term of this patent is extended or adjusted under 35 U.S.C. 154(b) by 305 days.

(21) Appl. No.: 16/666,827

(22) Filed: Oct. 29, 2019

(65) Prior Publication Data

US 2020/0230737 A1    Jul. 23, 2020

(30) Foreign Application Priority Data

Jan. 17, 2019    (DE) ...................... 10 2019 101 222.8

(51) Int. Cl.
*B23K 26/03* (2006.01)
*B23K 26/044* (2014.01)

(52) U.S. Cl.
CPC .......... *B23K 26/032* (2013.01); *B23K 26/034* (2013.01); *B23K 26/0344* (2015.10); *B23K 26/044* (2015.10)

(58) Field of Classification Search
CPC ................ B23K 26/032; B23K 26/034; B23K 26/0344; B23K 26/044
See application file for complete search history.

(56) References Cited

U.S. PATENT DOCUMENTS

| 4,907,169 A | * | 3/1990 | Lovoi | B23K 26/04 |
| | | | | 219/124.34 |
| 2004/0245227 A1 | * | 12/2004 | Grafton-Reed | B23K 26/043 |
| | | | | 219/121.83 |
| 2017/0045877 A1 | * | 2/2017 | Shapiro | G05B 19/406 |
| 2018/0186082 A1 | * | 7/2018 | Randhawa | B23K 26/125 |
| 2018/0297147 A1 | * | 10/2018 | Nishikawa | B23K 26/364 |

FOREIGN PATENT DOCUMENTS

| DE | 10335501 A1 | 2/2004 |
| DE | 102014101568 A1 | 8/2015 |
| DE | 102014008265 B3 | 9/2015 |
| WO | 2012/163545 A1 | 12/2012 |

OTHER PUBLICATIONS

Machine translation of DE 102014008265 abstract (Year: 2014).*

* cited by examiner

*Primary Examiner* — Jimmy Chou
(74) *Attorney, Agent, or Firm* — Blank Rome LLP

(57) ABSTRACT

A method for monitoring the process in laser material processing and provides a corresponding method, comprising the steps of taking a real-time image comprising the position and surrounding of the process where material processing occurs by a camera that is arranged in or on a laser material processing head; determining at least one image section in the real-time image and its position on a camera sensor; determining an actual position of the process in the material processing, and a nominal position of the relevant image detail using a projection of programmed path data for controlling the laser material processing head in the section of the real-time image, and the transfer of the at least one image section from the camera to a computer.

20 Claims, 1 Drawing Sheet

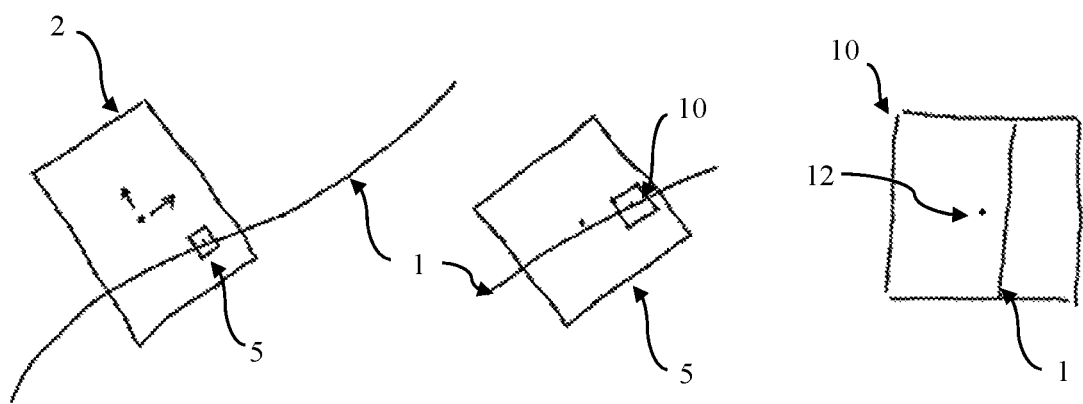

METHOD FOR SELECTION OF CAMERA IMAGE SECTIONS

CROSS-REFERENCE TO RELATED APPLICATIONS

The present application claims priority to German patent application DE 10 2019101 222.8, filed on Jan. 17, 2019. The aforementioned application is hereby incorporated by reference in its entirety.

BACKGROUND OF THE INVENTION

Field of the Invention

The invention relates a process for monitoring the process of laser material processing.

Brief Description of the Related Art

In laser material processing, image processing systems are used to control the seam tracking. Digital image processing systems are also used for process control, regulation, or control and quality assurance.

An essential task in the use of digital image processing is the selection of suitable images for the particular application. For example, when working on a part of a workpiece, an image must be selected that shows the relevant area of the edge that is to be machined or whose processing is to be controlled. Selection criteria oriented to the respective process are required for the selection of images or areas from a sequence of images.

In laser material processing, only a small portion of a camera image is usually required. By using suitable processes, the amount of data is reduced, which then also has an advantageous effect on the transmission, the required storage space and computational effort.

Published International application WO 2012/163545 A1 discloses a method for monitoring the machining of a workpiece with a high-intensity machining beam. The method disclosed in this document comprises the following steps: recording an electronically evaluable image containing at least the point of impact of the processing beam on the workpiece, generating actual image data, comparing the actual image data with target image data, generating an image error signal in case of a deviation of actual image data from the nominal image data, detecting the actual process parameters controlling the processing to be monitored synchronously with the generation of the actual image data, comparing the actual process parameters with nominal process parameters, generating a process error signal in the event of a deviation between the actual process parameters and the nominal process parameters, generating an error signal in the simultaneous presence of an image error signal and a process error signal, and triggering measures in the presence of an error signal. A disadvantage of the solution disclosed in this document is that it relies on the availability of nominal image data.

Laser remote welding is a special variant of laser beam welding. In this method, welding can take place in any direction in a three-dimensional space and the direction can change during the welding process. This is different to other welding heads, which usually only weld in one direction. In such devices, detectors or guide elements are used, which precede the joining process.

Another significant advantage of the remote laser welding compared to the laser beam welding is that it is possible by means of movable mirrors to jump much faster from one weld to another, so that the total processing time of a workpiece can be significantly reduced. In remote laser welding, therefore, the seam to be welded can theoretically be anywhere in the workspace.

SUMMARY OF THE INVENTION

The object of the present invention is therefore to provide a method, in particular for remote laser welding, enabling recording in a short time in three-dimensional space the relevant part of the workpiece. This relevant part may be in a state
1. before the process, if e.g., seam tracking is intended;
2. after the process, if e.g., quality control is intended;
3. around the process, if e.g., process control is intended.

The present invention provides a method of monitoring the process of laser material processing, comprising the steps of
  a. Recording a real-time image comprising the position and surroundings of the process during material processing by a camera arranged in or on a laser material processing head;
  b. Determining at least one image section in the real-time image and its location on a camera sensor, including the determination of
    i. an actual position of the process in material processing, as well as
    ii. a nominal position of the relevant image section using a projection of programmed path data for controlling the laser material processing head in the section of the real-time image; and
  c. Transferring the at least one image section from the camera to a computer.

The concept of determining a current position of the process in the material processing also includes the beginning or start of a new seam. Said beginning needs not to be exactly where it was programmed, for example, because workpieces are slightly misplaced. In this constellation, however, there is still no seam or a currently ongoing process.

In another aspect, the method may include calculating deviations between future actual and nominal positions.

Furthermore, the offsetting of the specific deviations with the programmed web data is provided for the prediction of future image sections.

It is also provided according to the invention that the at least one image section is edited. In particular, before the process takes place, the intended processing comprises determination of the exact position of an edge, perpendicular to the laser beam; determination of the exact position of an edge, along the laser beam; determination of the orientation of an edge; determination of the profile of an edge; determination of the edge presence of contamination or impurities around a position to be machined; and determination of the distance between the parts to be connected (e.g., distance between top and bottom plate). The term edge does not refer exclusively to the edge of the upper sheet that is to be processed, but can refer to a mark, with which the desired or nominal position of the laser material processing was marked on a workpiece.

Furthermore, the processing of image sections can take place in the process and then in particular to determine the size, shape, and depth of the so-called "keyholes" (=hole, which is burned by the laser during the machining of workpieces in the material), determining the shape of the so-called "keyhole", determining the depth of the so-called "keyhole", determining the amount of light from the process, determining the spatial light distribution during the process, determining the amount of droplets emitted by the process, determining the speed of droplets emitted by the process, determining the diameter of droplets emitted by the process, and determining a temperature profile related to the position of laser material processing.

In addition, the processing of image sections after the process, in particular the determination of the exact position of an attached seam, perpendicular to the laser beam; determination of the exact position of an attached seam, along the laser beam; determination of the shape of the produced seam; determination of the amount of pores in the produced seam; determination of the distance between top and bottom sheet after both have been joined; determination of surface finish immediately adjacent to the point being worked; determination of a temperature profile around the point which has been worked; and determination of the profile of at least one of the edges, if the purpose of the process was separation.

Also, the at least one image section of before or after the process can be used to determine the processing speed.

In a further embodiment, the method may include the recording of real-time images and/or a sequence when joining or separating workpieces.

Furthermore, it is provided that the camera is previously calibrated, wherein the calibration may include the focus on the position of the workpiece to be machined.

In addition, for the method according to the present invention, it may be provided that the path data additionally has predefined points of interest.

It is provided in a further embodiment of the method according to the invention that real-time images and/or the sequence of real-time images can be stored and/or the relevant image section and/or the sequence of image sections can be stored for documentation.

Furthermore, the data can be derived from a selected image section and compared with data stored in a database. The creation of a corresponding database is also a further aspect of the method according to the invention.

It is also provided according to the invention that data is derived from the at least one specific image section and stored.

A further aspect of the method according to the invention relates to the control of other devices by the laser material processing head based on determined deviations between future actual and nominal values.

The method of the present invention can also be configured so that the laser material processing head and/or the workpiece is guided depending on determined deviations between future actual and desired positions. Furthermore, it is also provided that the laser power is adjusted according to the determined deviations between the actual and nominal values.

Furthermore, the invention provides for the method that an actuator is set within the laser material processing head on the basis of determined deviations between actual and nominal values.

In a further aspect, the present invention relates to a method for selecting sections from camera images, comprising the steps of
 a. Recording of a real-time image and/or a sequence of real-time images before, during or after material processing by a camera arranged on a laser material processing head;
 b. Projecting the path data for controlling the laser material processing head in the material processing in the real-time image and/or the sequence of real-time images;
 c. Selection of at least one image section in the real-time image and/or a sequence of real-time images;
 in laser material processing.

Still, other aspects, features, and advantages of the present invention are readily apparent from the following detailed description, simply by illustrating preferable embodiments and implementations. The present invention is also capable of other and different embodiments and its several details can be modified in various obvious respects, all without de-parting from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

The invention will be described based on FIGURES. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

FIG. 1 shows in its left part a seam to be welded (line, 1), the working area of the remote welding head (large rectangle, 2), and the camera image (small square, 5). The middle part shows the camera image (large square, 5), the seam to be welded (line, 1), and the image section (area of interest, AOI, small rectangle, 10). The right part of the FIGURE shows the image section (large Square, 10), the seam to be welded (Line, 1), and the center of the picture (point in the square, 12)

DETAILED DESCRIPTION OF THE INVENTION

The above-stated object of the invention is achieved by the features of the independent claims. The dependent claims cover further specific embodiments of the invention.

The invention provides a method by which the material processing of a workpiece before, during, or after the joining or cutting process can be monitored or even corrected. In this case, the future position of the position of the material processing is calculated beforehand by the combined use of the path data on which the processing head is to be guided together with a section of a real-time image of the material processing.

By means of the method according to the invention, it is possible to monitor prior to the process, that is to say where welding is going to take place soon. Thus, the actual state of the nominal position of the position of the material processing can be detected and corrected. Thus, the position of the (future) process can already be corrected and not the current process or the current position of the material processing process. Time is needed for such a correction. The method according to the invention advantageously makes it possible to look ahead a few millimeters (i.e., "into the future"). The approximate location of the future location can be deduced, in particular in the remote welding process, from the current welding position in combination with the known desired position from the programmed path.

A position may also be considered at which the process itself took place within the meaning of what welding occurred. In this case, quality control is usually the aim. The relevant position can be deduced from the position where welding took place, i.e., from the data that are available to the remote welding head, possibly including the correction discussed in the previous paragraph.

It is still possible to look at the ongoing process, i.e., the position at which welding is currently being carried out. This variant offers the possibilities to regulate the process itself. However, this location is also well known, both in the real space and on the camera.

Due to the use of the planned and known path data of the laser material processing head, the method of the present invention allows not only to match the actual state with a nominal state or accurately reproduce the position of the process of material processing but on the basis of using of previously known data for path guidance of the laser processing head even directly upcoming events may be taken into account. Thus, the selection of the image area can already be planned in advance, wherein the processing of the image is faster because less data due to the reduction of the pixels to be transmitted and processed. As a result, relatively complex algorithms can be used, and it is nevertheless ensured to edit or determine the relevant image sections fast enough.

In the method according to the invention, the image area can be selected freely within the search range of a camera at runtime. In connection with the method according to the invention, it should be emphasized that the selection of the image area is accompanied by a reduction of the pixels. A calculation of the measured deviations from the programmed path takes place, and the relevant section in the camera image is predicted on that basis. In the method according to the invention, it is also possible to use only the programmed path for prediction, that is to say completely without seam guidance.

FIG. 1 shows in the left part the seam 1 to be welded, the working space 2 of the remote welding head and the camera image 5. In the center of FIG. 1, the camera image 5, the seam 1 to be welded and the relevant area of interest (AOI) are shown. The image section 10 shows the necessary area of the entire camera compartment 5, which is sufficient for the method according to the invention.

In the right part of FIG. 1, the image section 10 is shown, which can be seen to be welded seam 1 and the image center 12. The image center 12 corresponds to the position at which the remote welding head predicts the seam The remote welding head can weld seams anywhere in its working space 2 (FIG. 1, left part of the image). Also, there are no restrictions on the orientation of the seams to the workspace and thus to the remote weld head.

The seams are preprogrammed, so the remote welding head knows the course of the seams in the three-dimensional space. However, there may be small deviations in the space during processing, because the workpiece has a different shape than planned, the preparation of the workpiece was less accurate, or the welding head is differently orientated in space. In order to ensure that welding takes place exactly where welding should take place, according to the invention, a point is considered which is to be welded in immediate proximity, i.e., a few millimeters before the position of the actual welding process. Because this can be everywhere in principle, a camera takes up the entire spatial area around the position of the welding process (see FIG. 1, Middle).

According to the present invention, it is intended not to use the entire camera image, since too many pixels would be included in the calculation, making the calculation more complex resulting in more computing time that will be needed. Furthermore, using the entire image, many different details are seen in the image which are not relevant, and which may interfere with seam detection algorithms.

According to the invention, therefore, a small image section (=AoI, Area of Interest) is selected. It is intended to weld in this image section at time T2. However, this is in the future, so there is still time for correction. Thus, already at time T1, the current time of processing, it has to be determined where image section time T2 will lie exactly. This is calculated from the current (T1) position of the welding process and the programmed path, ultimately from the course of the nominal seam. Since the determination takes place in close spatial proximity, a few millimeters before the position of the welding process, the deviation between the nominal and actual seam is small and the actual seam is still located in the selected image section (FIG. 1, right part of the image).

FIG. 1 and the text above describe the method of selecting a patch if it is to be used for seam tracking. A similar process can be used to look into the welding process itself or to take the pictures of the already welded seam, e.g., for quality control. These positions can be calculated exactly from the available data. Likewise, these methods can be applied to other laser material processing processes, such as e.g., laser cutting.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 seam (to be welded)
2 Workspace remote welding head
5 camera image
10 image section
12 image center

What is claimed is:

1. A method of monitoring laser material processing of at least one workpiece performed by a laser material processing head, the method comprising the steps of:
   recording a real-time image using a camera sensor of a camera associated with the laser material processing head, the real-time image comprising a spatial area of the at least one workpiece surrounding a process point used in the laser material processing of the at least one workpiece performed by the laser material processing head;
   selecting at least one image section within the real-time image, the at least one image section having a location area that is smaller on the camera sensor of the camera compared to the spatial area of the real-time image, the selecting at least one image section includes selection of:

i. a current position of the process point within the real-time image at a current time (T1); and ii. a desired position for the process point at a future time (T2) based on a projection of programmed path data of the laser material processing head, the desired position having been identified after identification of the process point in the real-time image, and the programmed path data being configured to control the laser material processing head;

calculating a deviation between an actual position of the process point at the future time (T2) and the desired position of the process point at the future time (T2);

predicting, at the current position of the process point at the current time (T1), at least one future image section for selection within the real-time image at a further future time (T3) after the selection of the desired position at the future time (T2) based on the calculated deviation and the programmed path data; and selecting the at least one future image section within the real-time image at the further future time (T3).

2. The method of claim 1, comprising editing the at least one image section.

3. The method of claim 1, comprising using the at least one image section recorded before or after identification of the process point to determine a processing speed of the laser material processing head.

4. The method of claim 1, wherein recording the real-time image comprises recording a plurality of real-time images or a sequence of real-time images when joining or separating the at least one workpiece.

5. The method of claim 4, further comprising storing the plurality of real-time images or the sequence of real-time images.

6. The method of claim 1, comprising calibrating the camera prior to performing the method.

7. The method of claim 6, wherein calibrating the camera comprises calibrating a focus of the camera on the spatial area of the at least one workpiece.

8. The method of claim 1, wherein the programmed path data additionally comprise predefined points of interest.

9. The method of claim 1, comprising storing the at least one image section and/or a sequence of image sections including the at least one image section for documentation.

10. The method of claim 1, comprising:
deriving data from the at least one image section; and
comparing the derived data with data stored in a database.

11. The method of claim 1, comprising:
deriving data from the at least one image section; and
storing the derived data.

12. The method of claim 1, comprising controlling other devices associated with the laser material processing head based on the calculated deviation.

13. The method of claim 1, comprising guiding at least one of the laser material processing head and the at least one workpiece based on the calculated deviation.

14. The method of claim 1, comprising adjusting laser power of the laser material processing performed by the laser material processing head according to the calculated deviation.

15. The method of claim 1, comprising setting an actuator associated with the laser material processing head based on the calculated deviation.

16. The method of claim 1,
wherein recording the real-time image comprises recording a sequence of real-time images before, during, or after the laser material processing; and
wherein selecting the at least one image section comprises:
projecting the programmed path data in the sequence of real-time images; and
making the selection of the at least one image section based on the projected programmed path data in the sequence of real-time images.

17. The method of claim 1,
wherein recording the real-time image comprises recording the real-time image before, during, or after identification of the process point; and
wherein selecting the at least one image section comprises:
projecting the programmed path data in the real-time image; and
making the selection of the at least one image section based on the projected programmed path data in the real-time image.

18. The method of claim 1, further comprising transferring the at least one image section from the camera to a computer.

19. The method of claim 1, wherein the processing point is within the at least one image section.

20. The method of claim 1, wherein the at least one future image section is within the at least one image section.

* * * * *

UNITED STATES PATENT AND TRADEMARK OFFICE
CERTIFICATE OF CORRECTION

| | | |
|---|---|---|
| PATENT NO. | : 12,083,619 B2 | Page 1 of 1 |
| APPLICATION NO. | : 16/666827 | |
| DATED | : September 10, 2024 | |
| INVENTOR(S) | : Kallenbach et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this
Sixth Day of January, 2026

John A. Squires
*Director of the United States Patent and Trademark Office*